(12) United States Patent
Buchstab et al.

(10) Patent No.: US 7,762,292 B2
(45) Date of Patent: Jul. 27, 2010

(54) DISPENSING DEVICE FOR FREE-FLOWING OR POURABLE PRODUCTS

(75) Inventors: Martin Buchstab, Bopfingen (DE); Irene Dumkow, Sontheim (DE); Adolf Feinauer, Giengen (DE); Klaus Flinner, Zöschingen (DE); Bernd Heger, Haunsheim (DE); Peter Nalbach, Kirchheim/Nabern (DE); Kasim Yazan, Ulm (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 12/085,940

(22) PCT Filed: Oct. 26, 2006

(86) PCT No.: PCT/EP2006/067801

§ 371 (c)(1),
(2), (4) Date: May 28, 2008

(87) PCT Pub. No.: WO2007/062940

PCT Pub. Date: Jun. 7, 2007

(65) Prior Publication Data

US 2009/0159154 A1 Jun. 25, 2009

(30) Foreign Application Priority Data

Nov. 30, 2005 (DE) .................. 10 2005 057 152

(51) Int. Cl.
*B65B 1/04* (2006.01)
(52) U.S. Cl. .................. 141/369; 141/360; 62/389
(58) Field of Classification Search .............. 141/83, 141/94–96, 192, 198, 351, 360, 361, 369, 141/377; 73/290 R; 340/618, 619; 62/389; 222/129.1; 312/128, 129.1, 136, 313, 327
See application file for complete search history.

(56) References Cited

U.S. PATENT DOCUMENTS 6,039,219 A 3/2000 Bach et al.

(Continued)

FOREIGN PATENT DOCUMENTS

EP 1 584 602 10/2005

(Continued)

OTHER PUBLICATIONS

International Search Report PCT/EP2006/067801.

*Primary Examiner*—Gregory L Huson
*Assistant Examiner*—Jason K Niesz
(74) *Attorney, Agent, or Firm*—James E. Howard; Andre Pallapies

(57) ABSTRACT

A dispensing device for free-flowing or pourable products, said device comprising a dispenser opening for the products, which is situated in a recess on the front of the device and a support that can be removed from the recess and has at least one first tray surface for a container that is to be filled from the dispenser opening. The support comprises a base part that is detachably fixed in the recess and a tray part, on which the first tray surface is formed. Said tray part is connected to the base part in such a way that it can be displaced between a first position, in which the first tray surface lies opposite the dispenser opening at a first distance and a second position, in which the tray surface lies opposite the dispenser opening at a second distance that is greater than the first.

12 Claims, 3 Drawing Sheets

U.S. PATENT DOCUMENTS

| | | | |
|---|---|---|---|
| 6,138,869 A * | 10/2000 | DiSanto | 222/2 |
| 7,287,555 B2 * | 10/2007 | Heger et al. | 141/86 |
| 7,470,364 B2 * | 12/2008 | Oranski et al. | 210/198.1 |
| 2005/0268638 A1 * | 12/2005 | Voglewede et al. | 62/389 |

FOREIGN PATENT DOCUMENTS

| | | |
|---|---|---|
| GB | 2 401 169 | 11/2004 |

\* cited by examiner

Fig. 4
Fig. 5
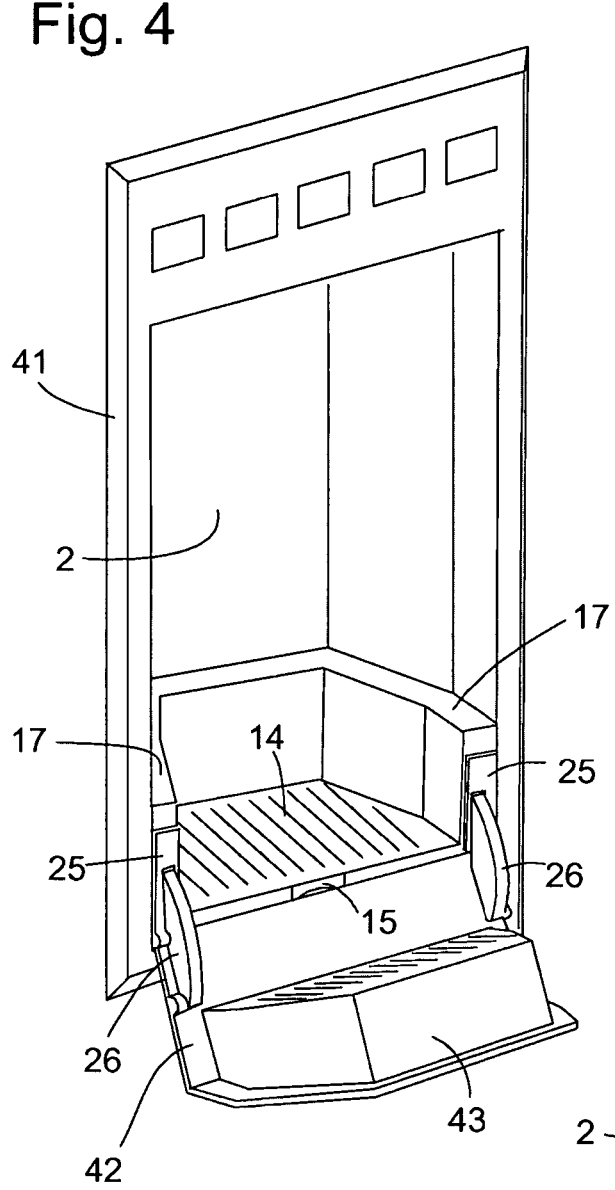
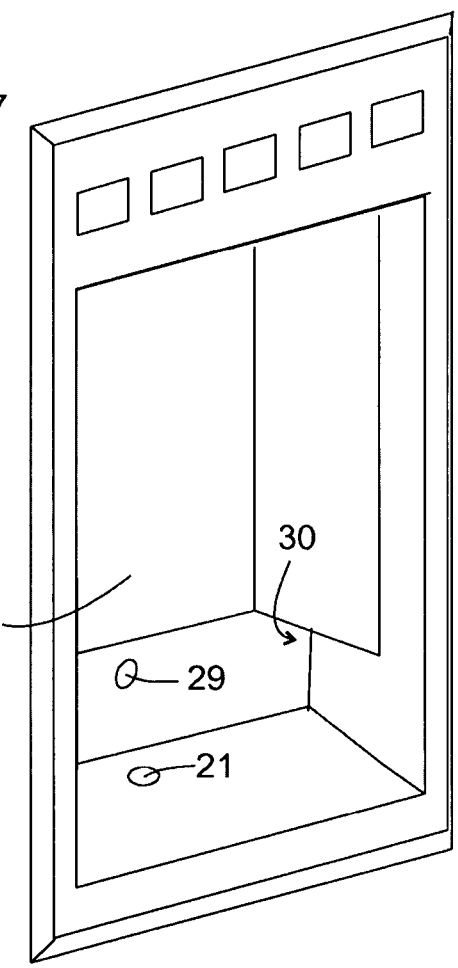

DISPENSING DEVICE FOR FREE-FLOWING OR POURABLE PRODUCTS

BACKGROUND OF THE INVENTION

The present invention relates to a dispensing device for dispensing free-flowing or pourable products, in particular cooled liquid and/or pieces of ice, into a container. Such a dispensing device is disclosed in GB 2 401 169 A, for example. In the case of this dispensing device, a dispenser opening is arranged in the upper region of a recess in which a container that is to be filled can be placed. A receptacle which serves to capture spilt filling product is located at the floor of the recess. In order to be able to empty and optionally clean the receptacle, it can be removed from the recess. Assuming the container that is to be filled has a suitable shape, said receptacle can also serve as a shelf surface for the container during filling.

In order to prevent spattering of the filling product while filling a container, the upper edge of the container must be placed as closely as possible beneath the dispenser opening. In this way, splashes which occur in the container when the filling product is at a low level do not usually come out of the container and, when the filling product level is high, the drop distance of the filling product is so small that splashes hardly occur. Containers which are placed in the recess for filling must therefore be adapted very exactly to the recess, both in their lateral dimensions and in height, in order that they can be filled tidily. All other containers must be held manually beneath the dispenser opening, though this again increases the risk of spillage if the container is not held still.

BRIEF SUMMARY OF THE INVENTION

The object of the invention is to provide a dispensing device for free-flowing or pourable products which allows tidy filling of containers having various dimensions and which, if filling product is nonetheless spilt, can easily be cleaned by a user.

The object is achieved by a dispensing device having a dispenser opening for the free-flowing or pourable products, in particular for dispensing cold water in the case of refrigerators, said dispenser opening being situated in a recess at a front side of the dispensing device, and having a support which can be removed from the recess and forms at least a first shelf surface for a container that is to be filled at the dispenser opening, wherein the support comprises a base part, this being detachably fixed in the recess, and a shelf part on which the first shelf surface is formed and which is connected to the base part in such a way that it can be moved between a first position, in which the first shelf surface lies opposite the dispenser opening at a first distance, and a second position in which a shelf surface lies opposite the dispenser opening at a second distance which is greater than the first distance. In this arrangement the shelf part can be moved to its two positions smoothly with the aid of a mechanism, in particular a uniformly geared mechanism such as e.g. a toothed-wheel mechanism.

Depending on the position of the shelf part, it is therefore possible reliably to fill containers having a height which is adapted to the first distance or to the second distance. If filling product is nonetheless spilt, simple cleaning of the reciprocally moving parts is ensured by virtue of the fact that the support can be removed as a whole and can be cleaned outside of the dispensing device, e.g. under running water.

A shelf surface which lies opposite the dispenser opening in the second position can be part of the base part. Alternatively, but preferably additionally, the first shelf surface also lies opposite the dispenser opening in the second position.

According to a preferred embodiment, a third shelf surface is formed at the shelf part and is oriented toward the dispenser opening in the second position.

In order that the first or the third shelf surface can be oriented toward the dispenser opening depending on position, the shelf part is preferably hinged to the base part.

The base part preferably lines at least a lower region of the recess. This prevents the walls of the recess itself from being splashed during operation and minimizes the amount of effort involved in cleaning the recess.

The support part can be guided in the recess by means of rails which extend in the withdrawal direction of the support part; alternatively or additionally, the support part and the recess can respectively comprise a pin and a socket which extend in the withdrawal direction of the support part.

In both cases, a simple pin extending at right angles relative to the withdrawal direction of the support part is sufficient to secure the installed support part in the recess.

The pin is preferably attached inconspicuously at a location which is concealed by the shelf part in the first position.

BRIEF DESCRIPTION OF THE DRAWINGS

Further features and advantages of the invention may be derived from the following description of exemplary embodiments with reference to the accompanying figures, in which:

FIG. 4 shows a perspective view of the dispensing device with support in a swung-open position; and FIG. 5 shows a perspective view of the dispensing device from which the support is removed.

DETAILED DESCRIPTION OF THE PRESENT INVENTION

Figure 1:
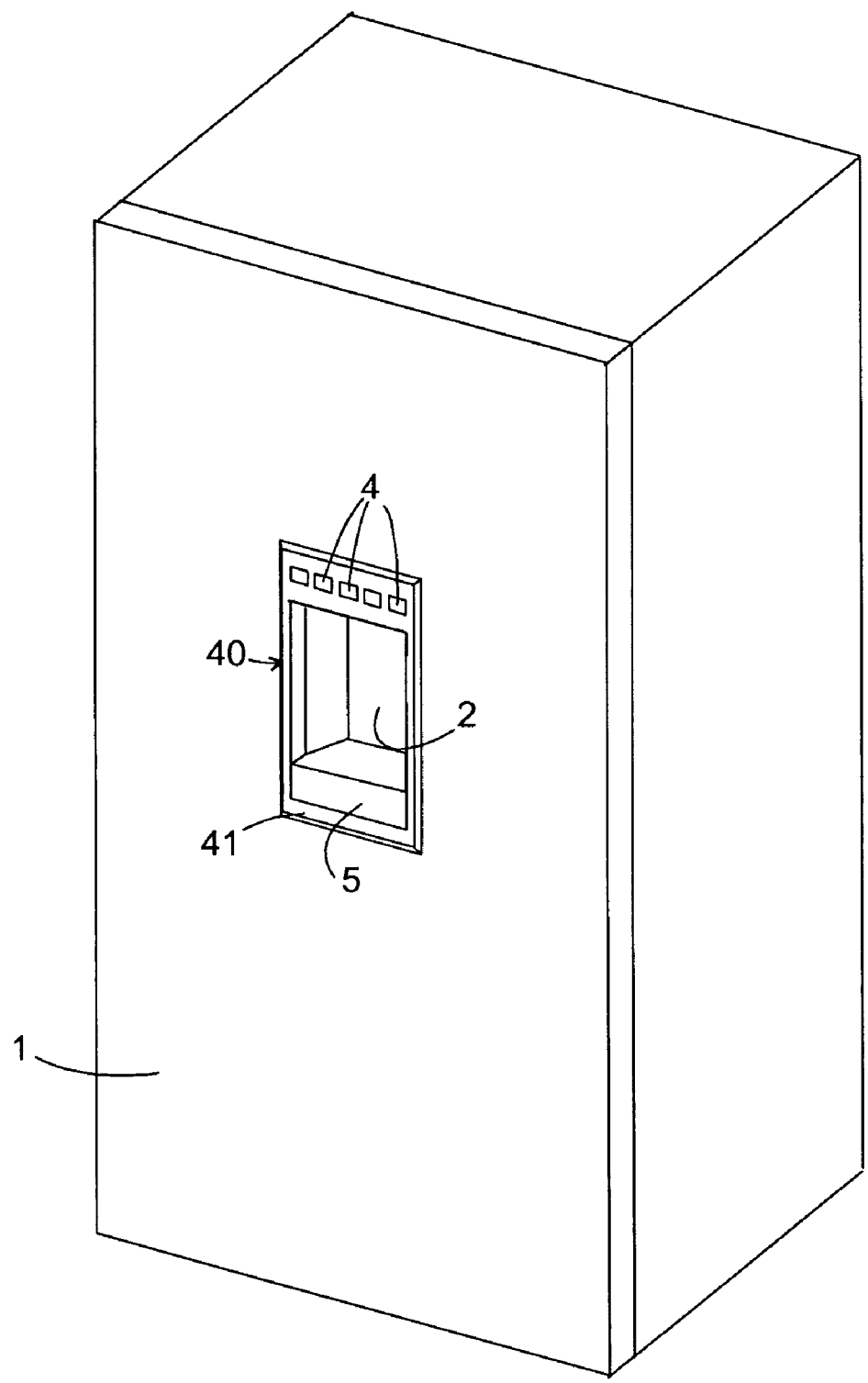
FIG. 1 shows a schematic view of a refrigerator which is equipped with a dispensing device for ice and cooled water in accordance with the present invention.

FIG. 1 is a perspective view of a refrigerator with a door 1 in which a dispensing device for water and ice is installed. A window is cut into the center of the outer skin of the door 1, and a plastic housing 40 that is open to the front is inserted into said window. The housing delimits a recess 2, in which a dispenser opening (not visible in the figure) for water and ice is attached at the top, and in which a container that is to be filled can be placed. A circumferential frame 41 of the housing 40 covers the window. An operating panel with a plurality of buttons 4 is formed in an upper region of the frame 41. A lower region of the recess 2 is filled by a support 5 whose function is explained further below.

Figure 2:
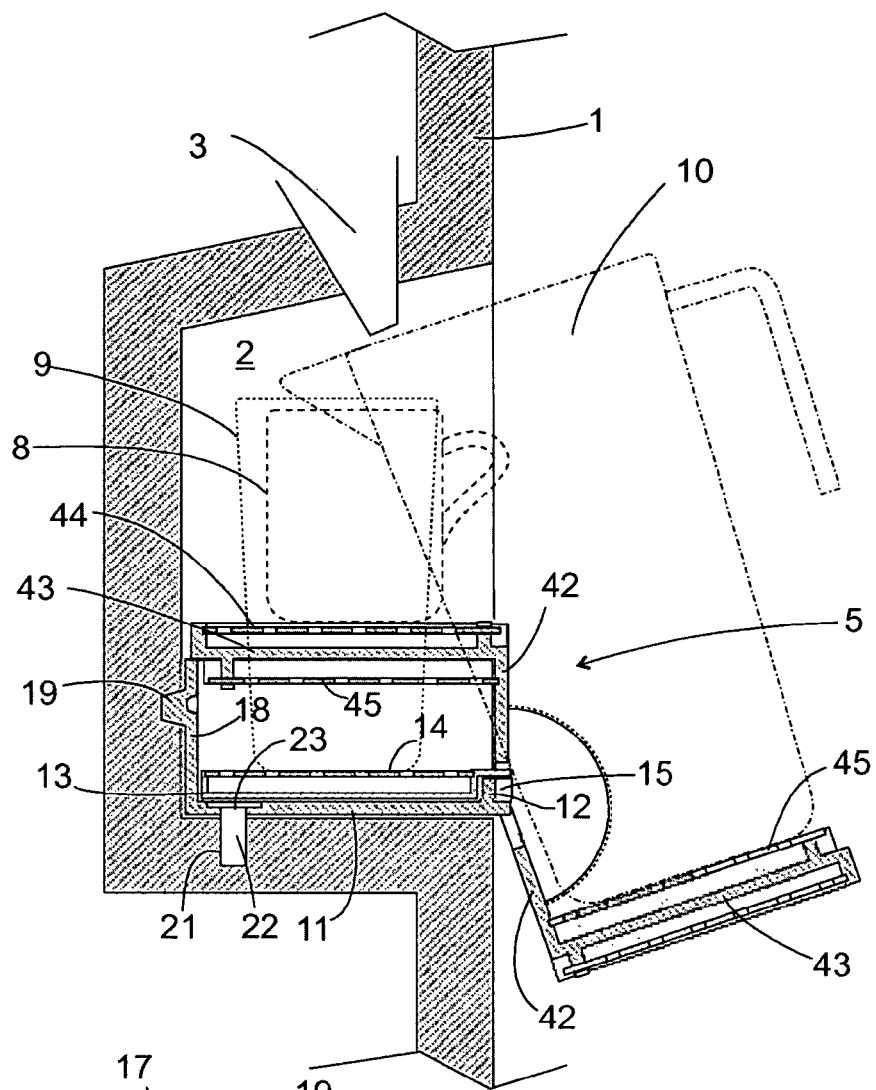
FIG. 2 shows a schematic section through a door of the refrigerator, in which door the dispensing device is installed.

FIG. 2 shows a section through the door 1 at the level of the recess 2. The dispenser opening for ice and/or cooled water is designated as 3.

The support 5 comprises two parts, a base part 6 and a shelf part 7, which are reciprocally pivotable about an axis which runs transversely relative to the sectional plane of FIG. 1. FIG. 2 shows the shelf part 7 simultaneously in two different stop positions of its pivot movement, a neutral position in which the shelf part 7 is situated within the recess 2, as shown in FIG. 1 also, and a swung-out position in which the shelf part 7 is situated outside of the recess 2.

The shelf part 7 is roughly L-shaped in cross-section, having a front plate 42 which is vertical in the neutral position and extends across the whole width of the recess 2, and a tray 43 which is oriented at right angles relative to the front plate 42 and projects horizontally into the recess 2 in the neutral position, filling the entire cross-sectional area thereof. The top and bottom sides of the tray 43 are hollowed out, and the hollow spaces are covered in each case by a grating 44 or 45 which can be engaged in the tray 43 in a detachable manner. A container of modest height, such as e.g. a cup 8 shown by a broken line, can be placed on the top grating 44 at a short distance from the dispenser opening 3 in the neutral position.

In the swung-open position of the shelf part 7, the base part 6 is exposed.

Figure 3:
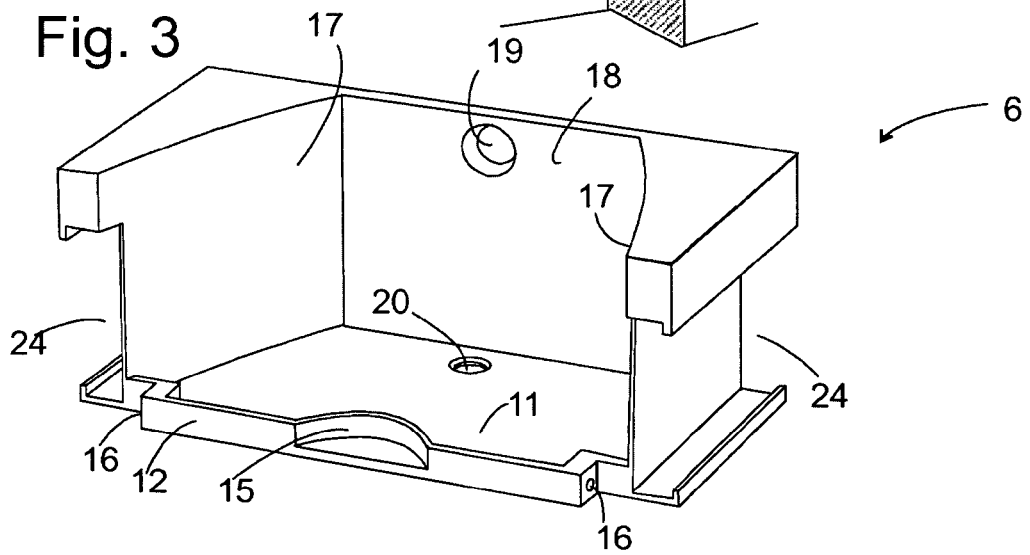
FIG. 3 shows a perspective view of the base part of the dispensing device.

FIG. 3 shows a perspective view of the base part 6. The base part 6 has roughly the shape of a cuboid box with open top and front sides. The floor plate 11 of the box is delimited on the front side by a narrow ridge 12 in order to form a flat receptacle in which a drip catcher can be placed. The drip catcher is shown in FIG. 2. It comprises a flat receptacle 13, the open top side of which is covered by a grating 14. A notch 15 over which an edge of the receptacle 13 projects is formed in the center of the ridge 12 such that in the swung-open position of the support 5 the drip catcher can be removed and emptied easily.

Two blind holes 16 are collinearly formed in a section of the ridge 12 which juts out beyond the front side of the door 1, and are provided in each case for the purpose of receiving shaft pieces that function as spindles for the pivot movement of the shelf part 7.

In the swung-open position, an average sized container such as e.g. a beaker 9 can be placed in the recess 2 directly on the drip catcher of the base part 6, or a large container such as e.g. a jug 10 can be placed on the grating 45 of the shelf part 7, this being oriented obliquely upward in the swung-open position, in a position in which the opening of the jug 10 projects into the recess 2 while its base rests on the shelf part 7 outside of the recess 2. The height of the jug can therefore be greater than the height of the recess 2 by approximately the height of the front plate 41.

Side walls 17 and a rear wall 18 of the base part 6 protect the interior of the recess 2 from splashes which can occur if filling product is spilt in the swung-open position of the shelf part 7 or drips directly from the dispenser opening 3 onto the grating 14.

A projection 19 is also formed on the rear wall 18, extending in the depth direction of the recess 2 and engaging in a reciprocal cavity in the rear wall of the recess 2 when the support 5 is correctly positioned in the recess 2.

When the support 5 is correctly positioned, an opening 20 which is formed in the floor plate 11 is also aligned with a cavity 21 in the floor of the recess 2 such that, as shown in FIG. 1, a locking pin 22 can be introduced through the opening 20 into the cavity 21. The locking pin 22 can be a screw which engages in a thread of the cavity 21, but can also be a simple cylindrical or tapered pin featuring a widened head 23 for greater ease of handling. As a result of the engagement of the projection 19 and the pin 22 into the respectively assigned cavities of the recess 2, the support 5 is immovably fixed in the recess 2 and therefore capable in the swung-open position of holding a heavy container such as a jug 10 without falling out of the recess 2.

Insertion slots 24 are formed in the wide side walls 17 of the base part 6, and are provided for accommodating a mechanism module 25 (see FIG. 4) in each case. The inside of the mechanism modules 25 contains in each case a toothed wheel which is braked by means of friction, a flywheel or similar, and meshes with a toothed wheel segment 26 at the front plate 42 of the shelf part 7. A spring can also be provided in the mechanism modules 25 in each case, which spring applies pressure to the shelf part 7 in the direction of its swung-closed position and is strong enough to swing the shelf part 7 closed if the latter is not loaded by a vessel that is to be filled.

FIG. 5 shows the recess 2 without the support 5 therein. The cavity 22 in the floor of the recess 2 and the cavity 29 which accommodates the projection 19 in the rear wall are visible. Also visible is one of two cavities 30 which are located opposite each other in the side walls of the recess 2. The cavities 30 accommodate rear corners of the side walls of the base part 6, thereby forming a rail-type guide in which the base part is movably guided in the depth direction of the recess.

The invention claimed is:

1. A dispensing device for free-flowing or pourable products comprising:
    a dispenser opening for the products;
    a recess at a front side of the device; the dispenser opening situated in the recess;
    a support which is removably received in the recess; the support having at least a first shelf surface for a container which is to be filled at the dispenser opening; the support including a base part which is detachably fixed in the recess and a shelf part on which the first shelf surface is formed and which is connected to the base part in such a way that it can be moved between a first position, in which the first shelf surface lies opposite the dispenser opening at a first distance, and a second position in which a shelf surface lies opposite the dispenser opening at a second distance; the second distance being greater than the first distance, wherein the support includes a plurality of rails; the support being guided in the recess by the rails which extend in the withdrawal direction of the support and being secured by a pin that is inserted at right angles relative to the withdrawal direction.

2. The dispensing device as claimed in claim 1 further including a second shelf surface forming a part of the base part; in the second position the second shelf surface lies opposite the dispenser opening.

3. The dispensing device as claimed in claim 1 wherein in the second position the first shelf surface lies opposite the dispenser opening.

4. The dispensing device as claimed in claim 1 further including a third shelf surface; in the second position the third shelf surface which is formed in the shelf part faces the dispenser opening.

5. The dispensing device as claimed in claim 1, wherein the shelf part is hinged to the base part.

6. The dispensing device as claimed in claim 1 wherein the base part lines at least a lower region of the recess.

7. The dispensing device as claimed in claim 1 wherein the support includes a projection and the recess includes an cavity; the projection and the cavity extending in the withdrawal direction of the support; the support being secured by a pin that is inserted at right angles relative to the withdrawal direction.

8. The dispensing device as claimed in claim 7 wherein the pin is concealed by the shelf part in the first position.

9. The dispensing device as claimed in claim 1 further including a mechanism; the shelf part being movable to its two positions by the mechanism.

10. The dispensing device as claimed in claim 9 wherein the mechanism is a uniformly geared mechanism.

11. The dispensing device as claimed in claim 10 wherein the uniformly geared mechanism is a toothed-wheeled mechanism.

12. The dispensing device as claimed in claim 1 wherein the dispensing device is a refrigerator.

* * * * *